United States Patent
Minakawa et al.

(10) Patent No.: US 8,630,506 B2
(45) Date of Patent: Jan. 14, 2014

(54) IMAGE CORRECTING DEVICE, METHOD FOR CREATING CORRECTED IMAGE, CORRECTION TABLE CREATING DEVICE, METHOD FOR CREATING CORRECTION TABLE, PROGRAM FOR CREATING CORRECTION TABLE, AND PROGRAM FOR CREATING CORRECTED IMAGE

(75) Inventors: Tsuyoshi Minakawa, Kawasaki (JP); Tatsuzo Hamada, Hadano (JP)

(73) Assignee: Hitachi Information & Communication Engineering, Ltd., Yokohama (JP)

( * ) Notice: Subject to any disclaimer, the term of this patent is extended or adjusted under 35 U.S.C. 154(b) by 149 days.

(21) Appl. No.: 13/035,537

(22) Filed: Feb. 25, 2011

(65) Prior Publication Data

US 2012/0051666 A1   Mar. 1, 2012

(30) Foreign Application Priority Data

Aug. 31, 2010   (JP) .................................. 2010-194772

(51) Int. Cl.
*G06K 9/40* (2006.01)
*H04N 7/00* (2011.01)

(52) U.S. Cl.
USPC .............................. 382/274; 382/254; 348/36

(58) Field of Classification Search
USPC ......... 382/103, 254, 274, 295; 348/36, 40, 39
See application file for complete search history.

(56) References Cited

U.S. PATENT DOCUMENTS

| | | | |
|---|---|---|---|
| 6,115,480 A * | 9/2000 | Washizawa | 382/103 |
| 7,570,280 B2 * | 8/2009 | Ozaki | 348/36 |
| 8,189,953 B2 * | 5/2012 | Kamiya et al. | 382/275 |
| 2002/0049532 A1 * | 4/2002 | Nakamura | 701/208 |
| 2004/0260469 A1 | 12/2004 | Mizusawa | |
| 2005/0265619 A1 * | 12/2005 | Ozaki | 382/254 |
| 2008/0129723 A1 | 6/2008 | Comer et al. | |
| 2008/0193042 A1 | 8/2008 | Masuda et al. | |
| 2010/0208032 A1 | 8/2010 | Kweon | |

FOREIGN PATENT DOCUMENTS

| | | |
|---|---|---|
| EP | 1 600 890 A2 | 11/2005 |
| JP | 2010-067172 | 3/2010 |
| KR | 2009-0012291 A | 2/2009 |
| WO | WO 2009/017331 A1 | 2/2009 |

OTHER PUBLICATIONS

European Patent Office extended search report on application 11155938.1 dated Jun. 26, 2012; 11 pages.

(Continued)

*Primary Examiner* — Andrae S Allison
(74) *Attorney, Agent, or Firm* — Foley & Lardner LLP

(57) ABSTRACT

An image correcting device includes an image input section, image storage section, correction table storage section, geometry correcting section subjecting an input image to geometrical correction based on a correction table, and image output section outputting the input image as a corrected image. The table is created by: calculating a pair of angles (θ, φ) corresponding to each pixel position on the output image as the corrected image; calculating a light direction based on an intersection line between a plane obtained by rotating a YZ plane by angle θ about Y axis and that by rotating an XZ plane by angle φ about X axis, in three dimensional Cartesian coordinate system with origin at a projection center of the input image; calculating a position on the input image corresponding to the light direction, as a resampling position; and associating the resampling position with the pixel position on the output image.

7 Claims, 9 Drawing Sheets

(56) References Cited

OTHER PUBLICATIONS

Ying X., et al., "Fisheye Lenses Calibration Using Straight-Line Spherical Perspective Projection Constraint," ACCV 2006 LNCS 3852, 2006, pp. 61-70.

European search report on application 11155938.1 dated Mar. 7, 2012; 6 pages.

* cited by examiner

RESAMPLING TABLE (CORRECTION TABLE)

| | PIXEL COORDINATE OF OUTPUT IMAGE (u COORDINATE) | | | |
|---|---|---|---|---|
| | 0 | 1 | ... | 639 |
| 0 | (203.5, 373.1) | (205.6, 370.9) | ... | (1076.5, 373.1) |
| 1 | (203.1, 374.5) | (205.2, 372.2) | ... | (1076.9, 374.5) |
| ⋮ | ⋮ | ⋮ | COORDINATES OF INPUT IMAGE $(x_m, y_m)$ | ⋮ |
| 479 | (203.5, 690.9) | (205.6, 693.1) | ... | (1076.5, 690.9) |

PIXEL COORDINATE OF OUTPUT IMAGE (v COORDINATE)

FIG. 5A
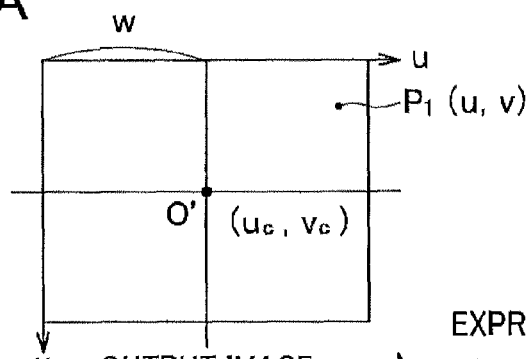
OUTPUT IMAGE
EXPRESSION (1)
$$\begin{cases} \theta = f(u) = \dfrac{\pi}{2} \cdot \dfrac{u-u_c}{w} \\ \phi = g(v) = \dfrac{\pi}{2} \cdot \dfrac{v-v_c}{w} \end{cases}$$
FIG. 5B
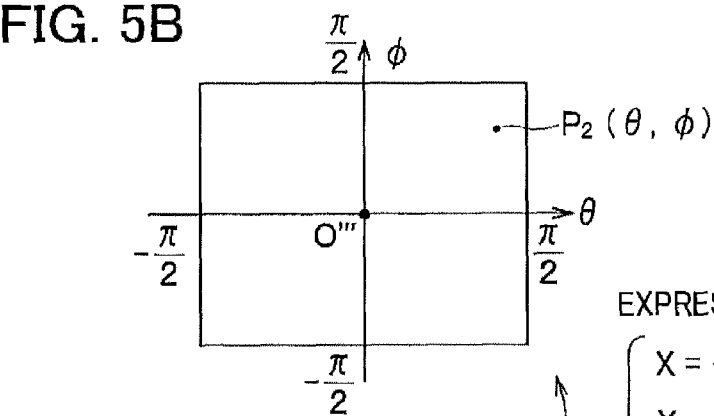
EXPRESSION (2)
$$\begin{cases} X = \dfrac{X_0}{N},\ Y = \dfrac{Y_0}{N},\ Z = \dfrac{Z_0}{N} \\ X_0 = \sin\theta \cdot \cos\phi \\ Y_0 = \cos\theta \cdot \sin\phi \\ Z_0 = \cos\theta \cdot \cos\phi \\ N = \sqrt{X_0^2 + Y_0^2 + Z_0^2} \end{cases}$$
FIG. 6A

FIG. 6A

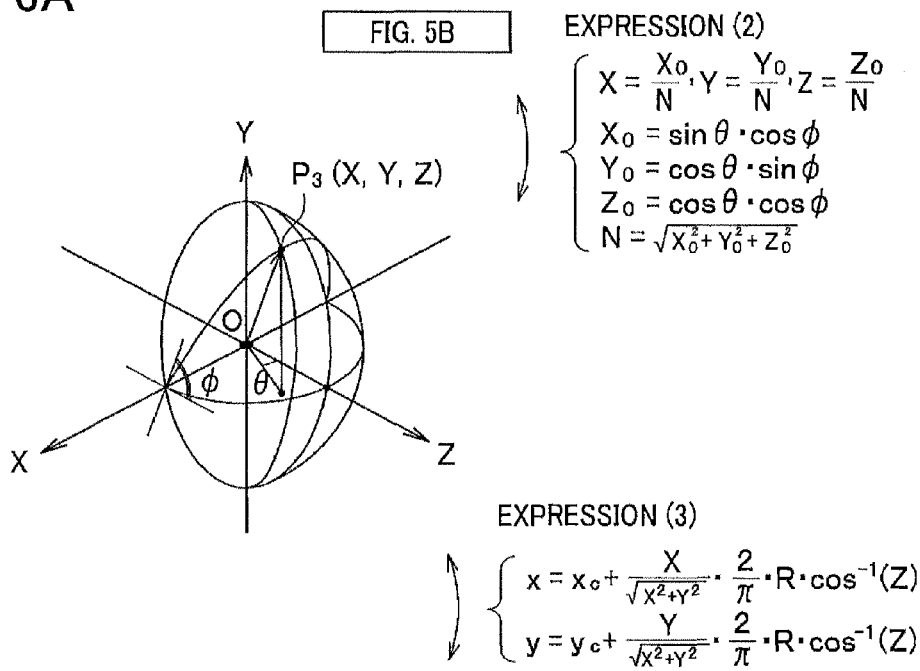

FIG. 5B

EXPRESSION (2)

$$\begin{cases} X = \dfrac{X_0}{N}, Y = \dfrac{Y_0}{N}, Z = \dfrac{Z_0}{N} \\ X_0 = \sin\theta \cdot \cos\phi \\ Y_0 = \cos\theta \cdot \sin\phi \\ Z_0 = \cos\theta \cdot \cos\phi \\ N = \sqrt{X_0^2 + Y_0^2 + Z_0^2} \end{cases}$$

EXPRESSION (3)

$$\begin{cases} x = x_c + \dfrac{X}{\sqrt{X^2+Y^2}} \cdot \dfrac{2}{\pi} \cdot R \cdot \cos^{-1}(Z) \\ y = y_c + \dfrac{Y}{\sqrt{X^2+Y^2}} \cdot \dfrac{2}{\pi} \cdot R \cdot \cos^{-1}(Z) \end{cases}$$

FIG. 6B

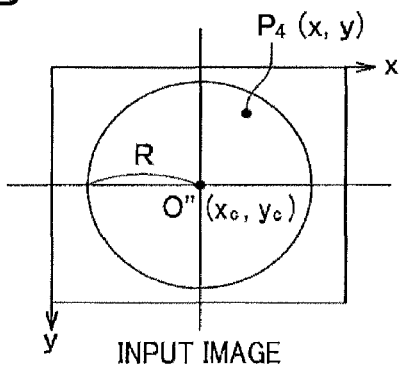

INPUT IMAGE

FISHEYE IMAGE (INPUT IMAGE)

CORRECTED IMAGE OF RELATED ART
(PERSPECTIVE TRANSFORMATION 160 DEGREES)
(OUTPUT IMAGE)

CORRECTED IMAGE IN EMBODIMENT
(OUTPUT IMAGE)

CORRECTED IMAGE IN EMBODIMENT
(MODIFIED EXAMPLE)
(OUTPUT IMAGE)

IMAGE CORRECTING DEVICE, METHOD FOR CREATING CORRECTED IMAGE, CORRECTION TABLE CREATING DEVICE, METHOD FOR CREATING CORRECTION TABLE, PROGRAM FOR CREATING CORRECTION TABLE, AND PROGRAM FOR CREATING CORRECTED IMAGE

CROSS REFERENCE TO RELATED APPLICATIONS

The application claims the foreign priority benefit under Title 35, United States Code, Section 119(a)-(d) of Japanese Patent Application No. 2010-194772, filed on Aug. 31, 2010, the contents of which are hereby incorporated by reference.

BACKGROUND

The present invention relates to a technique including an image correcting device configured to create an output image through geometrical correction of an input image.

In some application fields including a monitoring camera and a video door phone, there has been a demand in recent years for obtaining images of a wide visual field. As a solution to meet the demand, a video camera, with a fisheye lens, or the like is commercially available which captures an image in a range with a right/left angle of view of approximately 180 degrees. However, in general, in an image captured by such a device, a straight line in a subject space (for example, a straight line in the real world) is greatly distorted. Thus, there is a demand of performing geometrical correction to a captured image which allows a degree of distortion to be reduced.

There are various fisheye lenses according to different design concepts, including various applicable projection methods such as equidistance projection, equisolid angle projection, and orthogonal projection. In any of these projections, distortion of a line in an image captured with a fisheye lens (hereinafter, referred to as "a fisheye image") is completely correctable by applying perspective transformation based on a projection model and a design value/values and/or a given parameter/parameters estimated by a conventional technology, as long as the angle of view to be represented by an image subjected to the correction, that is, an image after correction, is smaller than 180 degrees.

FIG. 9A illustrates an example of a fisheye image. FIG. 9B illustrates an example where the fisheye image is corrected by applying perspective transformation such that the angle of view in a horizontal direction is ensured to be wide. As shown in FIG. 9B, as a result of the correction through perspective transformation, although a portion to be represented as a line is properly corrected to be linear, a marginal portion of the image is extremely expanded with an emphasis on perspective, causing a feeling of strangeness of the image. This is a problem caused by a significant difference between the angle of view represented by the image as a result of the correction and the angle of view when seeing that image.

JP 2010-067172 A discloses a technique developed to solve the problem. In the technique disclosed by JP 2010-067172 A, transformation expressions are designed such that characteristics of the transformation varies from those of a transformation similar to a perspective projection (perspective transformation), which is applied for the central portion of an image, to those of a transformation similar to an orthogonal projection, which is applied for the marginal portion of the image. Thus, a fisheye image inputted is corrected such that a line in a subject space appears linear in a vicinity of the center of the image, while an angle of view of 180 degrees is ensured in both the right/left direction and the top/bottom direction.

SUMMARY

The technique disclosed by JP 2010-067172 A has a problem, however, because the marginal portion is subjected to a projection method which is similar to orthogonal projection that a shape of a subject positioned in the marginal portion is extremely distorted. Thus, if the technique is applied to, for example, a video door phone, it is difficult to identify a person who is standing near the wall.

The present specification discloses an image correcting device, a method of creating a corrected image, a correction table creating device, a method of creating a correction table, a program for creating a correction table, and a program for creating a corrected image which reduce or eliminate a feeling of strangeness of an image after correction. For example, a method is provided in which a fisheye image as shown in FIG. 9A is subjected to correction, to thereby obtain a corrected result as shown in FIG. 10A or FIG. 10B. Note that FIG. 10A illustrates an example of a corrected image to which an embodiment has been applied, and FIG. 10B illustrates an example of a corrected image to which a modified example has been applied. It is understood that a white board near a circumference of an image circle of the inputted image of FIG. 9A remains its shape in FIG. 10A and FIG. 10B without being significantly distorted.

A disclosed image correcting device creates a corrected image through geometrical correction of an input image. The image correcting device includes: an image input section that inputs the input image; an image storage section that stores the input image; a correction table storage section that stores a correction table to be used for geometrical correction of the input image; a geometry correcting section that subjects the input image stored in the image storage section to geometrical correction based on the correction table; and an image output section that outputs the input image corrected by the geometry correcting section, as the corrected image. The correction table is created by: calculating a pair of angles ($\theta$, $\phi$) which corresponds to each pixel position on an output image as the corrected image; calculating a light direction based on a line of intersection between a plane obtained by rotating a YZ plane by the angle $\theta$ about Y axis and a plane obtained by rotating an XZ plane by the angle $\phi$ about X axis, in a three dimensional Cartesian coordinate system with an origin at a projection center of the input image; calculating a position on the input image corresponding to the light direction, as a resampling position; and associating the resampling position with the pixel position on the output image.

According to the teaching herein, a feeling of strangeness of an image after correction can be reduced or eliminated.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 5A is a diagram for illustrating coordinate system transformation for associating pixel coordinates on an output image with coordinates on an input image and illustrates an example of a coordinate system of the output image.

FIG. 5B is also a diagram for illustrating coordinate system transformation for associating pixel coordinates on the output image with coordinates on the input image and illustrates an example of an angular coordinate system.

FIG. 6A is a diagram for illustrating coordinate system transformation for associating pixel coordinates on the output image with coordinates on the input image and illustrates an example of a coordinate system for obtaining a light direction vector, based on θ and φ.

FIG. 6B is also a diagram for illustrating coordinate system transformation for associating pixel coordinates on the output image with coordinates on the input image and illustrates an example of a coordinate system of the input image.

DETAILED DESCRIPTION OF THE EMBODIMENT

An embodiment will be described below, with reference to FIG. 1 to FIG. 8.

Figures 1, 2:
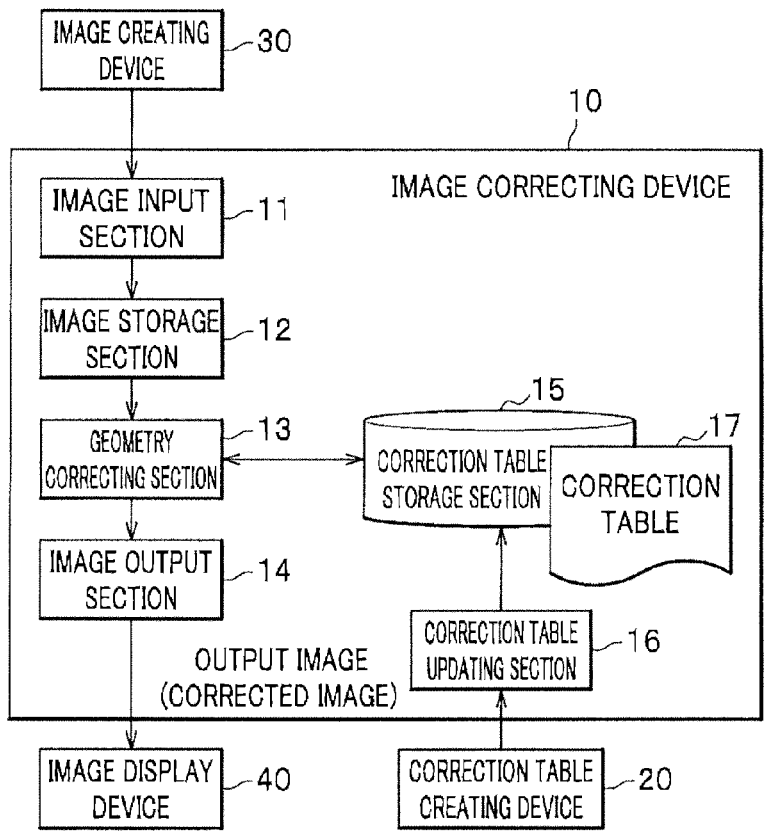
FIG. 1 is a diagram illustrating an example of the configuration of an image correcting device.
FIG. 2 is a diagram schematically illustrating an example of a correction table.

As shown in FIG. 1, an image correcting device 10 in the embodiment takes in an input image such as a fisheye image, corrects the image, and outputs the corrected image as an output image.

An image creating device 30 creates image data and supplies the image data to the image correcting device 10. In the present embodiment, the image creating device 30 will be described, taking an example of a digital video camera having a fisheye lens of an equidistance projection type with a horizontal angle of view of 180 degrees.

An image display device 40 displays the corrected image (output image) corrected by the image correcting device 10.

A correction table creating device 20 in the present embodiment creates a correction table (resampling table) 17 which is stored in a later-described correction table storage section 15 of the image correcting device 10. The correction table creating device 20 is configured with, for example, a personal computer.

The correction table creating device 20 creates the correction table 17, and then transmits the correction table 17 to the image correcting device 10 before a geometry correcting section 13 performs a geometry correction processing using the correction table 17.

If it is not necessary to update the correction table 17, that is, if parameters relevant to creation of the correction table 17 are not changed, the correction table creating device 20 can be separated from the image correcting device 10 after transmitting the created correction table 17.

<Configuration of Image Correcting Device 10>

As shown in FIG. 1, the image correcting device 10 includes an image input section 11, an image storage section 12, the geometry correcting section 13, an image output section 14, the correction table storage section 15, and a correction table updating section 16.

The image input section 11 reads an input image supplied from the image creating device 30 and writes the input image into the image storage section 12. Pixel values of each pixel of the read input image are digitized values which is any one of 256 integer values from "0" to "255" for each of primary colors (in the present embodiment, three colors of R, G, and B).

The input image can be read from the image creating device 30, using an interface that matches the configuration of the image creating device 30. For example, in a case where the input image is supplied as analog signals from the image creating device 30, an A/D converter can be employed for the configuration, and in a case where the input image is supplied as digital signals via a USB (Universal Serial Bus) or the like, an interface applicable to them can be employed for the configuration.

The image storage section 12 is provided with a memory (RAM: Random Access Memory) with a capacity that allows storage corresponding to at least two full frames of input images supplied from the image creating device 30. Two independent parts of the capacity of the image storage section 12 are alternately used for two purposes; one is a frame buffer into which the image input section 11 writes one frame of the input images, and the other is a frame buffer from which the geometry correcting section 13 refers pixel values of the previous frame of the input images.

Based on the correction table 17 stored in the correction table storage section 15 to be described hereinafter, the geometry correcting section 13 performs geometrical correction on the input image stored in the image storage section 12, and outputs an output image (corrected image) as a result of the geometrical correction to the image output section 14. The geometry correcting section 13 is configured with, for example, an FPGA (Field Programmable Gate Array) or an ASIC (Application Specific Integrated Circuit). Details of the processing performed by the geometry correcting section 13 will be described later (see FIG. 3).

The image output section 14 converts the output image (corrected image) outputted from the geometry correcting section 13, into appropriate video signals and outputs the video signals to the image display device 40. For example, if the image display device 40 is configured to display analog video signals, the image output section 14 is configured to have a D/A converter.

The correction table storage section 15 stores the correction table 17 to be described hereinafter and is configured with, for example, a rewritable nonvolatile memory.

The correction table updating section 16 receives the correction table 17 transmitted from the correction table creating device 20 and stores the received correction table 17 in the correction table storage section 15. The correction table updating section 16 can be configured to have, for example, a USB interface or an IEEE1394 interface that matches an interface on the side of the correction table creating device 20.

In the correction table 17, it is determined which pixels of the input image stored in the image storage section 12 are to be referred to in determining pixel values of respective pixels of the output image outputted from the geometry correcting section 13. In the present embodiment, as the correction table 17, a resampling table is used, which is, more specifically, "a table which associates each pixel of the output image to be outputted from the geometry correcting section 13, with a pair of fixed-point numbers (x, y) which corresponds to the each pixel and represents two-dimensional coordinate values on the input image stored in the image storage section 12". The correction table 17 is created by the correction table creating device 20 using a method to be described later (see FIG. 8). The created correction table 17 is stored in the correction table storage section 15 via the correction table updating section 16.

The resampling table (correction table) 17 associates, as shown in FIG. 2, for example, pixel coordinates (u, v) on the output image, with coordinates (x, y) on the input image. FIG. 2 shows an example of a resampling table (correction table) in a case of 640 pixels along u axis and 480 pixels along v axis. Note that u and v are integers, however, x and y are not necessarily integers. In a case where coordinates (x, y) on the input image associated with pixel coordinates (u, v) on the output image are positioned outside the input image, predetermined exception values, for example, (−1, −1) are stored in association with the pair of (u, v).

<Operation of Geometry Correcting Section 13 in Image Correcting Device 10>

The operation of the geometry correcting section 13 of the image correcting device 10 will be described below, with reference to FIG. 3 (refer to FIG. 1 for configuration, as appropriate).

It is herein assumed that an input image is stored in the image storage section 12, and the correction table 17 is stored in the correction table storage section 15.

Figure 3:
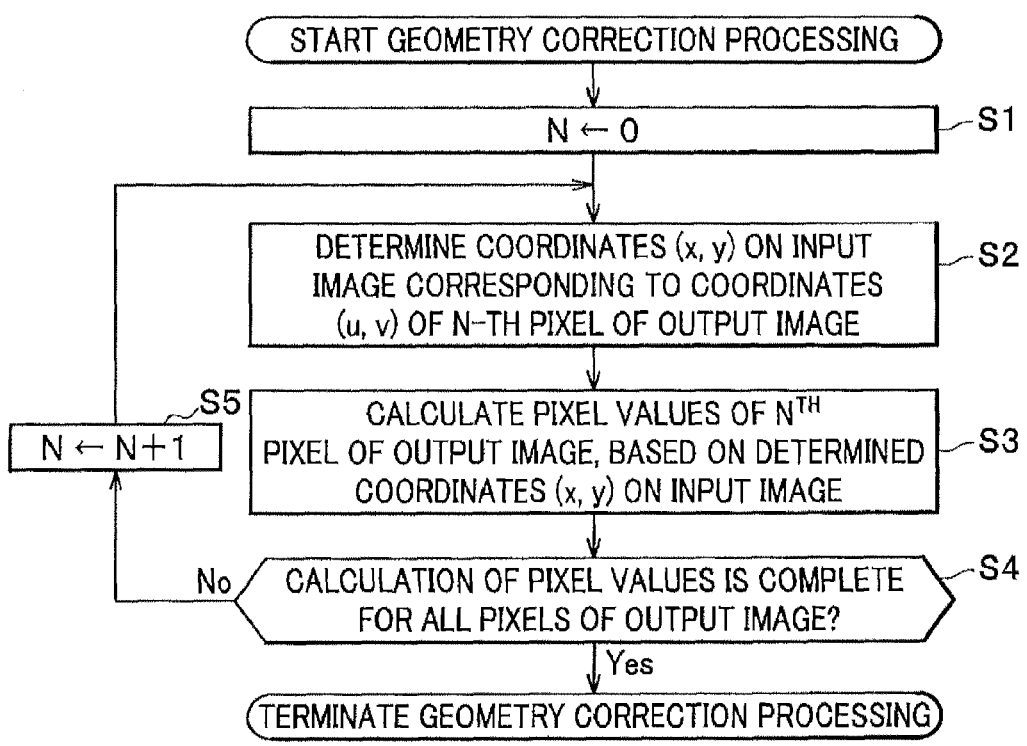
FIG. 3 is a flowchart illustrating an example of operations of a geometry correcting section of the image correcting device.

In step S1, as shown in the flowchart of FIG. 3, the geometry correcting section 13 sets the value of N of a counter to "0".

In step S2, the geometry correcting section 13 determines coordinates (x, y) on the input image that correspond to the coordinates (u, v) of the $N^{th}$ pixel on the output image. More specifically, the geometry correcting section 13 divides the value of N of the counter by the number of pixels along u axis of the output image and sets the obtained quotient as the value of v and the obtained remainder as the value of u, to thereby calculate the pixel coordinates (u, v) on the output image. The geometry correcting section 13 then determines the coordinates (x, y) on the input image that correspond to the pixel coordinates (u, v) on the output image, based on the correction table 17.

In step S3, the geometry correcting section 13 calculates the pixel values of the $N^{th}$ pixel of the output image, based on the determined coordinates (x, y) on the input image. More specifically, for example, based on the coordinates (x, y) on the input image, the pixel values of the output image are determined by bilinear interpolation using the pixel values of the four nearest pixels on the input image for each of the primary colors (namely, for each of the RGB colors). Other conventional technologies such as bicubic interpolation may be used for calculating the pixel values of the output image.

If corresponding coordinate values do not exist on the input image, in other words, if the coordinates (x, y) on the input image having been determined based on the resampling table 17 are prescribed exception values, the geometry correcting section 13 sets the pixel values of the $N^{th}$ pixel of the output image to, for example, "black", namely (R, G, B)=(0, 0, 0).

In step S4, the geometry correcting section 13 determines whether or not calculation of pixel values has been completed for all the pixels of the output image.

If it is determined that calculation of pixel values has already been completed for all the pixels of the output image (if Yes in step S4), the geometry correcting section 13 terminates the geometry correction processing.

On the other hand, if it is determined that there is a pixel for which calculation of pixel values has not yet completed among the pixels of the output image (if No in step S4), the geometry correcting section 13 adds "1" to the value of N of the counter (step S5). Subsequently, the process returns to step S2 and continues processing.

Determination as to whether or not calculation of pixel values has been completed for all the pixels of the output image can be carried out by comparison between the value of N of the counter and the number of pixels of the output image.

<Configuration of Correction Table Creating Device 20>

Figure 4:
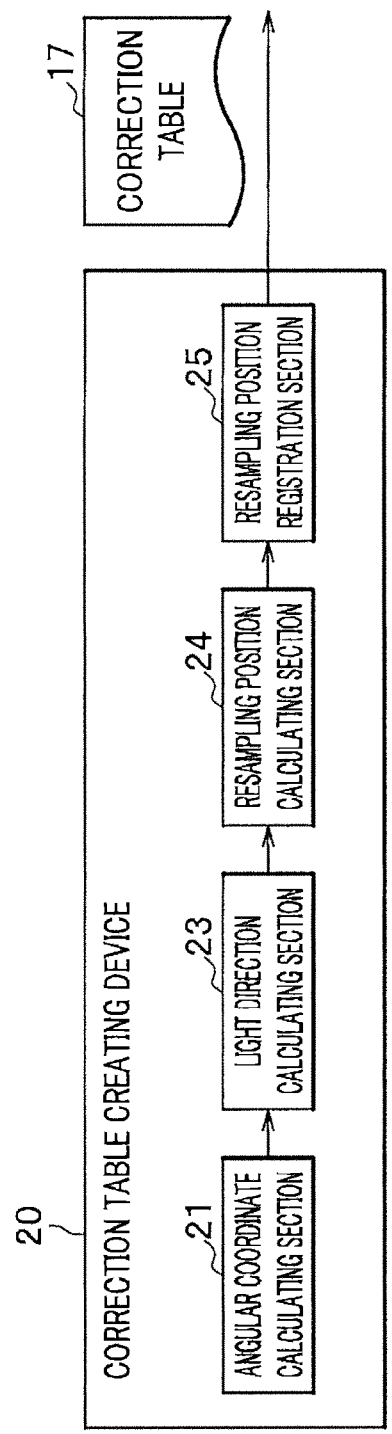
FIG. 4 is a block diagram illustrating an example of the configuration of a correction table creating device.

As shown in FIG. 4, the correction table creating device 20 includes an angular coordinate calculating section 21, a light direction calculating section 23, a resampling position calculating section 24, and a resampling position registration section 25.

The angular coordinate calculating section 21 calculates coordinate values (θ, φ), on an angular coordinate system, that correspond to the pixel coordinates (u, v) on the output image. In the present embodiment, in order to associate the pixel coordinates at the left end of the output image with a longitude of "−90 degrees (=−π/2)" and also associate the pixel coordinates at the right end of the output image with a longitude of "90 degrees (=π/2)", calculation is performed according to the following Expression (1), using a constant "w" for normalization of the scale along u axis.

$$\begin{cases} \theta = f(u) = \dfrac{\pi}{2} \cdot \dfrac{u - u_c}{w} \\ \phi = g(v) = \dfrac{\pi}{2} \cdot \dfrac{v - v_c}{w} \end{cases} \quad \text{Expression (1)}$$

Thus, the u-v coordinate system of the output image shown in FIG. 5A is transformed into a θ-φ coordinate system (angular coordinate system) shown in FIG. 5B. Herein, ($u_c$, $v_c$) are the coordinates of the center position of the output image. For example, if the number of pixels along u axis of the output image is 640, the value of $u_c$ is calculated as "(0+639)/2" to be "319.5". The value of $v_c$ can be calculated likewise. The constant w is introduced for the above-described purpose, is set to be equal to the value of $u_c$, and is applied also to normalization of the scale along v axis as shown in Expression (1), in order to ensure consistency of the scale over the entire output image. $P_1$ (u, v) is transformed into $P_2$ (θ, φ).

The light direction calculating section 23 calculates a light direction vector (X, Y, Z) from inputted θ and φ. The light direction calculating section 23 calculates the light direction vector (X, Y, Z) according to following Expression (2).

$$\begin{cases} X = \dfrac{X_0}{N}, Y = \dfrac{Y_0}{N}, Z = \dfrac{Z_0}{N} \\ X_0 = \sin\theta \cdot \cos\phi \\ Y_0 = \cos\theta \cdot \sin\phi \\ Z_0 = \cos\theta \cdot \cos\phi \\ N = \sqrt{X_0^2 + Y_0^2 + Z_0^2} \end{cases} \quad \text{Expression (2)}$$

Thus, the θ-φ coordinate system (angular coordinate system) shown in FIG. 5B is transformed into an XYZ coordinate system shown in FIG. 6A. The XYZ coordinate system is a coordinate system of a subject space. $P_2$ ($\theta$, $\phi$) is transformed into $P_3$ (X, Y, Z). Point O is the center of projection. A light direction vector (X, Y, Z) is a direction vector normalized to have a length of "1". $P_3$ is present on a plane that is obtained by rotating XZ plane by $\phi$ about X axis and also on a plane obtained by rotating YZ plane by $\theta$ about Y axis. The reason for obtaining the light direction vector (X, Y, Z) in such a manner will be described later.

The resampling position calculating section 24 calculates, as a resampling position, coordinates (x, y) on the input image from the light direction vector (X, Y, Z) calculated by the light direction calculating section 23. The resampling position is the coordinates (x, y) on the input image and is the optimum position in resampling, from the input image, pixel values of a pixel that is present at the pixel coordinates (u, v) on the output image. Because the input image in the present embodiment has been captured using a fisheye lens of an equidistance projection type, the resampling position calculating section 24 calculates the coordinates (x, y) on the input image according to, for example, the following Expression (3).

$$\begin{cases} x = x_c + \dfrac{X}{\sqrt{X^2 + Y^2}} \cdot \dfrac{2}{\pi} \cdot R \cdot \cos^{-1}(Z) \\ y = y_c + \dfrac{Y}{\sqrt{X^2 + Y^2}} \cdot \dfrac{2}{\pi} \cdot R \cdot \cos^{-1}(Z) \end{cases} \quad \text{Expression (3)}$$

Thus, the XYZ coordinate system shown in FIG. 6A is transformed into the x-y coordinate system, shown in FIG. 6B, of the input image. Herein, ($x_c$, $y_c$) are the coordinates of the center of the image circle of the input image. R represents the radius of the image circle and corresponds to the half angle of view of 90 degrees. $P_3$ (X, Y, Z) are transformed into $P_4$ (x, y).

It is herein assumed that $x_c$, $y_c$, and R are registered in advance as design values in the correction table creating device 20. Further, the sorts of camera parameters in the present embodiment are not limited thereto and can make various modifications depending on a projection model to be used. The sorts of camera parameters may also be estimated from one or plural input images using a conventional technology. For example, the coordinates ($x_c$, $y_c$) of the center of the image circle and the radius R of the image circle can be estimated from an estimation of a circle using a conventional technology, making use of the fact that an outer portion of the image circle is typically black in color (that is, extremely small values are stored as the respective pixel values (R, G, B)). Further, instead of Expression (3), a correction expression including a higher-order term for correction of distortion in an optical system according to a conventional technology may be applied.

The resampling position registration section 25 registers the coordinates (x, y) on the input image calculated by the resampling position calculating section 24 in the correction table 17, in association with the pixel coordinates (u, v) on the output image. If the coordinates (x, y) on the input image calculated by the resampling position calculating section 24 is positioned outside the input image, prescribed exception values, for example, (−1, −1) are registered in association with (u, v) as described above.

Figure 7A:
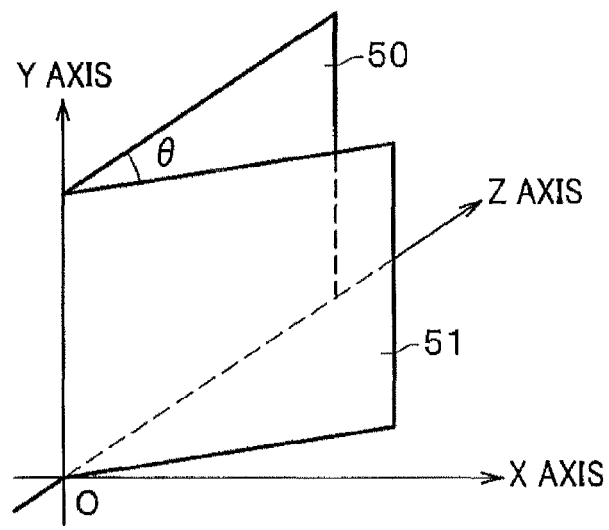
FIG. 7A is a diagram illustrating how θ is taken by a light direction calculating section of the correction table creating device.
Figure 7B:
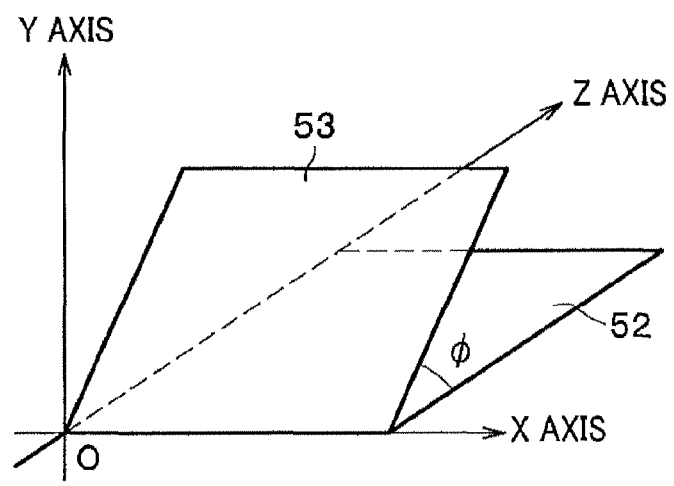
FIG. 7B is a diagram illustrating how φ is taken by the light direction calculating section of the correction table creating device.

Herein, the reason for obtaining the light direction vector (X, Y, Z) in such a manner is described with reference to FIGS. 7A and 7B as well as FIGS. 5A, 5B, 6A and 6B.

The light direction vector (X, Y, Z) calculated by Expression (2) corresponds to a vector obtained in the following manner. That is, as shown in FIGS. 7A and 7B, a direction vector of a half line as below is calculated. The half line can be obtained as a half line of intersection between a half-plane 51 obtained by rotating YZ half-plane 50 (Z≥0), which is a first base plane, by $\theta$ about Y axis and a half-plane 53 obtained by rotating XZ plane 52 (Z≥0), which is a second base plane, by $\phi$ about X axis. Finally, the direction vector of the half line is normalized to have a length of "1".

If $\theta$ and $\phi$ are applied in this manner, all points on a line parallel to Y axis in the subject space will be necessarily on a plane defined by a certain $\theta$. Accordingly this line becomes a line on an image after correction; and all points on a line parallel to X axis in the subject space come to lie on a plane defined by a certain $\phi$. The line will still remain as a line on an image after correction. That is, a line parallel to X axis or Y axis in the subject space can still remain as a line also on an image after correction, which is advantageous.

<Operation of Correction Table Creating Device 20>

The operation of the correction table creating device 20 will be described below, with reference to FIG. 8 (see FIG. 4 for configuration, as appropriate).

Figure 8:
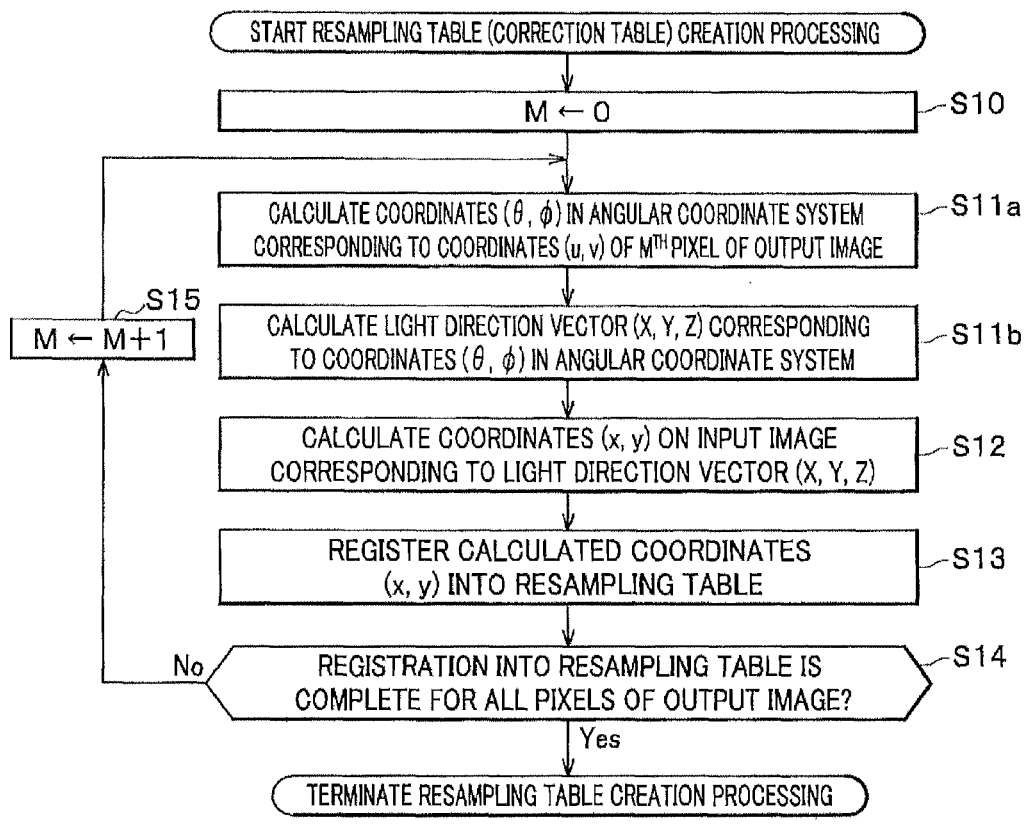
FIG. 8 is a flowchart illustrating an example of operations of the correction table creating device.
Figure 9A:
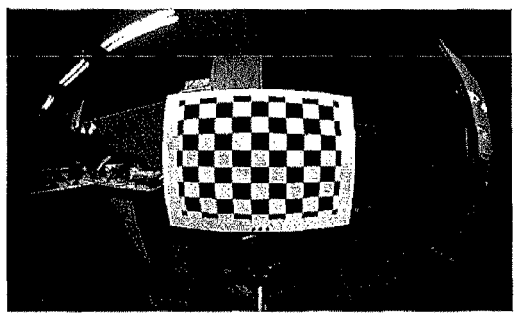
FIG. 9A is a diagram illustrating an example of a fisheye image (as an input image).
Figure 9B:
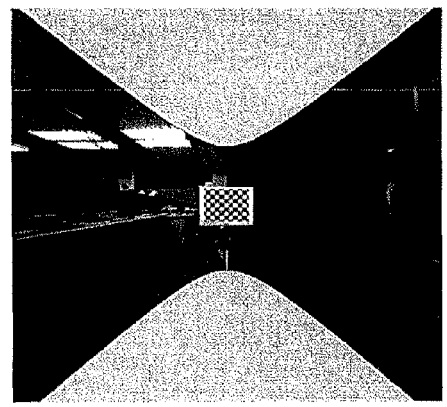
FIG. 9B is a diagram illustrating an example of a corrected image (output image) as a result of correcting the fisheye image (input image) in FIG. 9A, by applying perspective transformation of the related art.
Figure 10A:
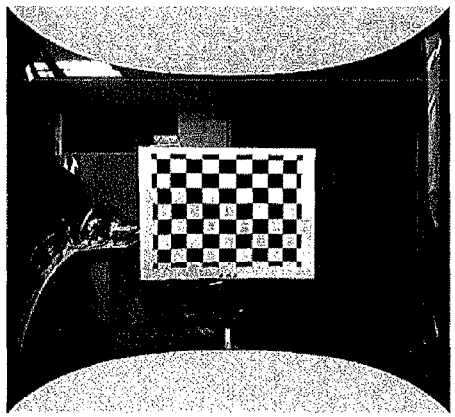
FIG. 10A is a diagram illustrating an example of a corrected image (output image) as a result of applying the embodiment to the fisheye image (input image) in FIG. 9A.
Figure 10B:
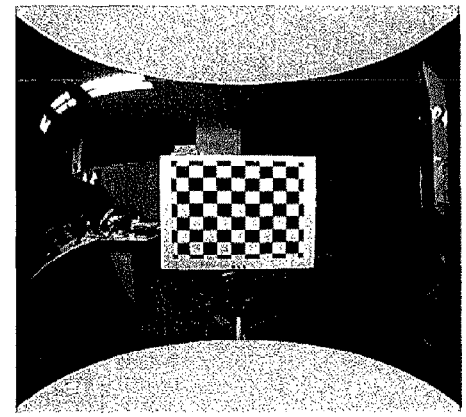
FIG. 10B is a diagram illustrating an example of a corrected image (output image) as a result of applying a modified example of the embodiment to the fisheye image (input image) in FIG. 9A.

As shown in the flowchart of FIG. 8, in step S10, the correction table creating device 20 sets the value of M of the counter to "0".

In step S11a, the angular coordinate calculating section 21 calculates coordinate values ($\theta$, $\phi$) on the angular coordinate system corresponding to the pixel coordinates (u, v) on the output image.

In step S11b, the light direction calculating section 23 calculates a light direction vector (X, Y, Z), based on the coordinate values ($\theta$, $\phi$) on the angular coordinate system calculated by the angular coordinate calculating section 21.

In step S12, the resampling position calculating section 24 calculates coordinates (x, y) on the input image corresponding to the light direction vector (X, Y, Z).

In step S13, the resampling position registration section 25 registers the calculated coordinates (x, y) in association with the pixel coordinates (u, v) on the output image in a resampling table (correction table) (not shown).

In step S14, the correction table creating device 20 determines whether or not the registration into the resampling table (correction table) has been completed for all the pixels on the output image.

If the registration into the resampling table (correction table) has been completed for all the pixels on the output image (if Yes in step S14), the correction table creating device 20 terminates the resampling table (correction table) creation processing.

On the other hand, if there is still a pixel for which registration into the resampling table (correction table) is not yet completed among the pixels of the output image (if No in step S14), the correction table creating device 20 adds "1" to the value of M of the counter (step S15). The process then returns to step S11a, and continues the processing.

Note whether the registration into the resampling table (correction table) has been completed for all the pixels of the output image can be determined by comparing the value of M of the counter with the number of pixels of the output image.

The above-described operations make it possible to reduce damage of the shape of a subject in marginal portions of an image after correction and also to reduce a degree of distortion of lines to be represented as vertical or horizontal lines in an image after correction, compared with those before the correction.

Modified Example

An embodiment has been described above, however, the invention is not limited thereto, and, for example, the following modifications can be made without departing from the spirit of the present invention.

The image creating device 30 is not limited to the example described above, and various modifications and changes can be made, for example, employing a digital camera having a wide-angle lens, a digital camera having a fisheye lens designed with one of various projection methods including equidistance projection, a video camera having a wide-angle lens or a fisheye lens, or a video reproducing device for reproducing video images captured by these devices and stored in a storage medium. If the projection method of an input image is changed, Expression (3) can be modified to an expression suitable for the changed projection method, and such a change is easy.

Further, the device to be coupled with the image output section 14 is not limited to the image display device 40. Various modifications and changes can be made depending on the usage purpose, for example, by coupling a storage device for storing corrected images or a transfer device for transferring corrected images to another system.

Still further, in the method of calculating pixel coordinates (u, v) from the value of N of the counter, the calculation is made in the embodiment by setting a quotient of the value of N divided by the number of pixels along u axis of the output image, to the value of v, and by setting the remainder, to the value of u, so as to make the pixels referred to in the order of raster scan. However, the order of referring to the pixels of the output image is not limited thereto.

Yet further, the correction table 17 is not limited to a resampling table. For example, in a case where the image correcting device 10 is configured to perform correction such that the geometry correcting section 13 performs correction while calculating the coordinates (x, y) on the input image that correspond to the pixel coordinates (u, v) on the output image each time, parameters relevant to the input image and parameters relevant to the output image can be stored in the correction table storage section 15 as the correction table 17. In this case, the storage capacity of the correction table storage section 15 is smaller compared with a case in which a resampling table is used as the correction table 17.

If the above configuration is used, as a method of obtaining coordinates on the input image corresponding to pixel coordinates on the output image, the geometry correcting section 13 may be configured to perform the flow shown in FIG. 8 as it is (however, it is not necessary to register the calculated coordinates (x, y) into the resampling table (step S13), and pixel values of the output image can be instantly determined based on the calculated coordinates (x, y)). Or, the geometry correcting section 13 may be configured to use a composite function which is prepared in advance and with which the coordinates (x, y) on the input image that correspond to the pixel coordinates (u, v) on the output image can be directly calculated from the coordinates (u, v). Further, the correction table updating section 16 may be configured to include a data input device such as a keyboard, to thereby enable a user to change parameters relevant to the output image.

Further, the foregoing embodiment has been described taking an example where the vertical and horizontal directions of the fisheye image correspond with the vertical and horizontal directions of the output image. However, embodiments are not limited thereto. For example, if a fisheye camera provided with a three-axis acceleration sensor is used, a resampling table may be created such that the gravity direction matches the vertical direction of an output image, based on information on the gravity direction in a subject space obtained by the camera. More specifically, it is only necessary to rotate the direction of a coordinate system by a conventional technology, in associating a fisheye image with the surface of the ground. Such a change can be made easily.

Further, in calculating the coordinates (x, y) on the input image corresponding to the light direction vector (X, Y, Z) in the resampling table creation processing in FIG. 8, reading of the angle of view may be changed. That is, instead of performing calculation with an assumption that the radius R of the image circle corresponds to a half-angle of view of 90 degrees that is the real half-angle of view, calculation may be performed with assumption that the radius R of the image circle corresponds to a half-angle of view that is larger than the real half-angle of view. In a case of correcting an image captured by a fisheye lens of a equidistance projection type, transformation can be performed, for example, by following Expression (4) using a correction coefficient $\beta$ ($0<\beta<1$), instead of Expression (3).

$$\begin{cases} x = x_c + \dfrac{X}{\sqrt{X^2+Y^2}} \cdot \dfrac{2}{\pi} \cdot R \cdot \cos^{-1}(Z) \cdot \beta \\ y = y_c + \dfrac{Y}{\sqrt{X^2+Y^2}} \cdot \dfrac{2}{\pi} \cdot R \cdot \cos^{-1}(Z) \cdot \beta \end{cases} \quad \text{Expression (4)}$$

By adding such a reading change processing of the angle of view, in comparison with the original operation of the foregoing embodiment, distortion of the images of a line in the vertical direction and a line in the horizontal direction in the subject space increases on the output image. However, distortion of a line in an oblique direction in the subject space can be reduced in marginal portions of the output image. Note that the value of the correction coefficient $\beta$ may be a function of Z, instead of a constant.

Still further, although the angle change rate is constant in the foregoing embodiment, different angle change rates may be set at the central portion and at a marginal portion of the output image. For example, a parameter $\alpha$ ($0<\alpha<1$) is determined in advance as to what degree a ratio between the angle change rate at the central portion and that at the marginal portion of an output image can be tolerated. If the angle change rate at the central portion of the output image is represented by $\Theta$ and the angle change rate at the left and right ends of the output image is set to ($\alpha \cdot \Theta$), the angle change rate is determined according to following Expression (5). Note that, as the value of $\alpha$, a value equal to or greater than 0.84 is preferably employed based on properties of a photograph captured by a lens with a focal length of 50 mm, which is the focal length of a standard lens of a 35 mm film camera.

$$f'(u) = \Theta - (1-\alpha) \cdot \dfrac{|u - u_c|}{w} \cdot \Theta \quad \text{Expression (5)}$$

Thus, calculation of $\theta = f(u)$ from the value of u is performed according to following Expression (6).

Expression (6)

$$\begin{cases} f(u) = \Theta \cdot (u - u_c) - \dfrac{1}{2} \cdot (1-\alpha) \cdot \dfrac{(u-u_c)^2}{w} \cdot \Theta & (\text{if } 0 \le u - u_c) \\ \text{or } f(u) = \Theta \cdot (u - u_c) + \dfrac{1}{2} \cdot (1-\alpha) \cdot \dfrac{(u-u_c)^2}{w} \cdot \Theta & (\text{otherwise}) \end{cases}$$

Consequently, it is possible to make the angle change rate smaller at a portion closer to the margin of an image, while maintaining the angle change rate within a given range. Herein, the value of $\Theta$ can be calculated according to the following Expression (7), on condition that a value of if(u) is 90 degrees at the right end of the output image.

$$\Theta = \frac{\pi}{w \cdot (1 + \alpha)} \quad \text{Expression (7)}$$

Further, the range of the angle in the horizontal direction represented by the output image is not limited to the range from −90 degrees to 90 degrees. The range of the angle in the horizontal direction represented by the output image can be changed by changing the value "π/2" which is used in the calculation of θ and φ according to Expression (1), to a desired value.

Still further, in the embodiment, the pixel values of each pixel of the input image read by the image input section 11 are set to digitized values, each of which being one of the 256 integers from "0" to "255" (that is, the color depth is 8 bits per pixel), for each of the primary colors (R, G, B). However, embodiments are not limited thereto. For example, a change may be made such as to increase gradations represented by the respective primary colors to 1024 ranging from "0" to "1023" (that is, the color depth is 10 bits per pixel). Even if this change causes a difference between the gradations that can be represented by the input image and the gradations that can be represented by the output image, the difference can be easily handled by a conventional technology. Further, application to multi-primary colors, such as using five colors of (R, G, B, C (cyan), Y (yellow)) as primary colors, can be easily performed using a conventional technology.

Yet further, the correction table storage section 15 may be configured to have a storage medium which is attachable to and detachable from the image correcting device 10, such as an SD memory card. In this case, the correction table creating device 20 is configured to have an SD memory card writer or the like with which the resampling table (correction table) 17 created by the correction table creating device 20 is registered into the correction table storage section 15. This eliminates a need for the image correcting device 10 to include the correction table updating section 16. Such a configuration is suitable for a case where the resampling table (correction table) 17 is not frequently updated.

The specification and drawings are, accordingly, to be regarded in an illustrative rather than a restrictive sense. It will, however, be evident that various modifications and changes may be made thereto without departing from the spirit and scope of the invention(s) as set forth in the claims.

What is claimed is:

1. An image correcting device for creating a corrected image through geometrical correction of an input image, comprising:
    an input interface configured to input the input image;
    a memory configured to store the input image;
    a geometrical correcting circuit configured to subject the input image stored in the memory to geometrical correction by: calculating a pair of angles (θ, φ) which corresponds to each pixel position (u, v) on an output image as the corrected image; calculating a light direction (X, Y, Z) based on a line of intersection between a plane obtained by rotating a YZ plane by the angle θ about Y axis and a plane obtained by rotating an XZ plane by the angle φ about X axis, in a three dimensional Cartesian coordinate system with an origin at a projection center of the input image; calculating a position on the input image corresponding to the light direction, as a resampling position; and associating the resampling position with the pixel position on the output image; and
    an output interface configured to output the input image corrected by the geometrical correcting circuit, as the corrected image,
    wherein a ratio of a first angle change rate of each of the angles (θ, φ) at the edge of the output image to a second angle change rate of each of the angles (θ, φ) at the center of the output image is within a predetermined numerical range.

2. An image correcting device according to claim 1, wherein the ratio of the first angle change rate to the second angle change rate is equal to or greater than 0.84 and less than 1.

3. An image correcting device according to claim 1, wherein the angle θ and the angle φ are determined by the expressions $$\theta = f(u) = \frac{\pi}{2} \cdot \frac{u - u_c}{w} \text{ and } \phi = g(v) = \frac{\pi}{2} \cdot \frac{v - v_c}{w},$$

wherein $(u_c, v_c)$ are the pixel position coordinates of the center position of the output image, and w is a normalization constant,
and the light direction coordinates X, Y, Z are determined by the expressions $$X = \frac{X_0}{N}, Y = \frac{Y_0}{N}, Z = \frac{Z_0}{N},$$
$$X_0 = \sin\theta \cdot \cos\phi,$$
$$Y_0 = \cos\theta \cdot \sin\phi,$$
$$Z_0 = \cos\theta \cdot \cos\phi, \text{ and}$$
$$N = \sqrt{X_0^2 + Y_0^2 + Z_0^2}.$$

4. A method of creating a corrected image through geometrical correction of an input image, comprising the steps of:
    inputting the input image;
    storing the input image;
    subjecting the input image stored in the image storage section to geometrical correction by: calculating a pair of angles (θ, φ) which corresponds to each pixel position (u, v) on an output image as the corrected image; calculating a light direction (X, Y, Z) based on a line of intersection between a plane obtained by rotating a YZ plane by the angle θ about Y axis and a plane obtained by rotating an XZ plane by the angle φ about X axis, in a three dimensional Cartesian coordinate system with an origin at a projection center of the input image; calculating a position on the input image corresponding to the light direction, as a resampling position; and associating the resampling position with the pixel position on the output image; and
    outputting the input image corrected in the step of geometrical correction as the corrected image,
    wherein a ratio of a first angle change rate of each of the angles (θ, φ) at the edge of the output image to a second angle change rate of each of the angles (θ, φ) at the center of the output image is within a predetermined numerical range.

5. A non-transitory computer-readable medium containing computer program instructions for creating a corrected image for executing the method according to claim 4.

6. A method according to claim 4, wherein the ratio of the first angle change rate to the second angle change rate is equal to or greater than 0.84 and less than 1.

7. A method according to claim 4, wherein the angle $\theta$ and the angle $\phi$ are determined by the expressions $$\theta = f(u) = \frac{\pi}{2} \cdot \frac{u - u_c}{w} \text{ and } \phi = g(v) = \frac{\pi}{2} \cdot \frac{v - v_c}{w},$$

wherein $(u_c, v_c)$ are the pixel position coordinates of the center position of the output image, and w is a normalization constant, and the light direction coordinates X, Y, Z are determined by the expressions $$X = \frac{X_0}{N}, Y = \frac{Y_0}{N}, Z = \frac{Z_0}{N},$$
$$X_0 = \sin\theta \cdot \cos\phi,$$
$$Y_0 = \cos\theta \cdot \sin\phi,$$
$$Z_0 = \cos\theta \cdot \cos\phi, \text{ and}$$
$$N = \sqrt{X_0^2 + Y_0^2 + Z_0^2}.$$

* * * * *